United States Patent
Fang et al.

(10) Patent No.: US 12,005,951 B2
(45) Date of Patent: Jun. 11, 2024

(54) BASKET AVOIDANCE MECHANISM AND BABY STROLLER FRAME

(71) Applicant: WONDERLAND SWITZERLAND AG, Steinhausen (CH)

(72) Inventors: Liwu Fang, Dongguan (CN); Erxue Wang, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 291 days.

(21) Appl. No.: 17/499,481

(22) Filed: Oct. 12, 2021

(65) Prior Publication Data
US 2022/0111884 A1 Apr. 14, 2022

(30) Foreign Application Priority Data
Oct. 13, 2020 (CN) .......................... 202022279202.8

(51) Int. Cl.
*B62B 9/24* (2006.01)
(52) U.S. Cl.
CPC ...................................... *B62B 9/24* (2013.01)
(58) Field of Classification Search
CPC .... B62B 9/24; B62B 9/26; B62B 9/12; B62B 9/00; B62B 9/245; B62B 7/00; B62B 7/10; B62B 7/08
See application file for complete search history.

(56) References Cited

U.S. PATENT DOCUMENTS

| RE31,760 E | * | 12/1984 | Kassai | ...................... B62B 9/26 |
| | | | | 280/42 |
| 6,273,451 B1 | * | 8/2001 | Julien | ...................... B62B 7/08 |
| | | | | 280/47.33 |

(Continued)

FOREIGN PATENT DOCUMENTS

| CA | 2341964 A1 | 11/2001 |
| CN | 202283929 U | 6/2012 |

(Continued)

OTHER PUBLICATIONS

Office Action issued in counterpart Taiwan Patent Application No. 110137848 dated Jan. 9, 2023.

(Continued)

*Primary Examiner* — James M Dolak
(74) *Attorney, Agent, or Firm* — Volpe Koenig

(57) ABSTRACT

This disclosure provides a basket avoidance mechanism including a first tubing, a second tubing, a fixing member arranged on first tubing and a locking member arranged on the second tubing. The fixing member extends towards the locking member towards the locking member to form an abutting part, and the locking member extends corresponding to the abutting part to form an abutted part. When the first tubing is unfolded, the second tubing is in an unfolded position under a support of the first tubing by abutment of the abutting part against the abutted part; and when the first tubing is folded, the second tubing is folded to a folded position by avoiding abutment of the abutting part against the abutted part. The basket avoidance mechanism enables the basket tube to be unfolded or folded smoothly, and its structure is simple. A baby stroller frame is also provided.

19 Claims, 10 Drawing Sheets

(56) References Cited

U.S. PATENT DOCUMENTS

| | | | | |
|---|---|---|---|---|
| 7,011,318 B2* | 3/2006 | Chen | | B62B 9/26 280/47.38 |
| 7,185,909 B2* | 3/2007 | Espenshade | | B62B 9/26 280/647 |
| 7,290,786 B2* | 11/2007 | Cheng | | B62B 9/26 280/647 |
| 7,588,263 B2* | 9/2009 | Yang | | B62B 9/26 280/642 |
| 7,862,069 B2* | 1/2011 | King | | B62B 9/26 280/642 |
| 8,444,170 B2* | 5/2013 | Chen | | B62B 7/08 280/647 |
| 8,444,172 B2* | 5/2013 | Cheng | | B62B 7/044 280/650 |
| 8,833,794 B2* | 9/2014 | Yi | | B62B 7/044 280/649 |
| 9,050,993 B2* | 6/2015 | Pollack | | B62B 9/12 |
| 9,776,652 B2* | 10/2017 | Zhong | | B62B 7/10 |
| 9,950,730 B2* | 4/2018 | Gao | | B62B 7/062 |
| 11,738,792 B2* | 8/2023 | Haut | | B62B 9/20 280/47.38 |
| 11,851,099 B2* | 12/2023 | Nieuwenhuizen | | B62B 9/12 |
| 2013/0207369 A1 | 8/2013 | Pollack | | |

FOREIGN PATENT DOCUMENTS

| | | |
|---|---|---|
| CN | 203558111 U | 4/2014 |
| CN | 205872149 U | 1/2017 |
| CN | 206968736 U | 2/2018 |
| CN | 109955884 A | 7/2019 |
| CN | 209719698 U | 12/2019 |
| CN | 110914136 A | 3/2020 |
| TW | M544445 U | 7/2014 |

OTHER PUBLICATIONS

Office Action counterpart Chinese Patent Application No. 202110850560.6, dated Sep. 23, 2022.

* cited by examiner

BASKET AVOIDANCE MECHANISM AND BABY STROLLER FRAME

CROSS-REFERENCE TO RELATED APPLICATIONS

The present application is based on and claims the benefit of and priority to Chinese Patent Application No. 202022279202.8, filed on Oct. 13, 2020, the entire contents of which being incorporated herein by reference.

TECHNICAL FIELD

The present disclosure relates to the field of baby products, and particularly to a basket avoidance mechanism for a baby stroller frame.

BACKGROUND

In order to meet the consumer's requirements for practicality and portability, carrier frames, in view of their structure designs, are generally designed to be foldable, such that they can be fully stretched when in use, and can be folded into a smaller volume for convenient storage or carrying when not in use.

A general frame includes a front leg tube, a rear leg tube, a driver tube, a seat, a backrest tube and a basket tube and the like. When the frame is folded, the seat may slide downward along the driver tube and slide down to a lowermost end of the driver tube, and the front leg tube, the rear leg tube, the rear leg tube and the backrest tube will be close to each other and are folded together. Generally, during the relative pivoting and folding of the front leg tube and the rear leg tube, the basket tube will also fall to the folded position at the same time, otherwise the basket tube will interfere with the folding motion of the backrest tube, and the backrest tube will be jammed at the basket tube, so that when the frame needs to be unfolded, the frame may be adversely affected when it is switched from the folded state to the unfolded state. The existing folding and unfolding structure of the basket tube are not only complicated, but also difficult to ensure the smooth folding of the basket tube, resulting in jamming between the basket tube and the backrest tube.

In order to solve the above problems, it is necessary to provide a basket avoidance mechanism.

SUMMARY

An objective of the present disclosure is to provide a basket avoidance mechanism, which enables the basket tube to be unfolded or folded smoothly, and has the advantage of having a simple structure.

Another objective of the present disclosure is to provide a baby stroller frame, which enables the basket tube to be unfolded or folded smoothly so as to ensure the smooth unfolding or folding of the frame, and which has the advantage of having a simple structure.

In order to achieve the above objective, the present disclosure provides a basket avoidance mechanism including a first tubing, a second tubing, a fixing member and a locking member, the fixing member is arranged on the first tubing, the locking member is arranged on the second tubing, the fixing member extends towards the locking member to form an abutting part, and the locking member extends corresponding to the abutting part to form an abutted part, when the first tubing is unfolded, the second tubing is in an unfolded position under a support of the first tubing by an abutment of the abutting part against the abutted part; and when the first tubing is folded, the second tubing is folded to a folded position by avoiding the abutment of the abutting part against the abutted part.

Compared with the related art, since in the basket avoidance mechanism of the present disclosure, the fixing member is arranged on the first tubing, and at the same time, the locking member is arranged on the second tubing, the fixing member extends towards the locking member to form an abutting part, and the locking member extends corresponding to the abutting part to form an abutted part, when the first tubing is unfolded, the second tubing is in an unfolded position under the support of the first tubing by an abutment of the abutting part against the abutted part; and when the first tubing is folded, the second tubing is folded switched from the unfolded position to the folded position by avoiding the abutment of the abutting part against the abutted part. In other words, when the first tubing is folded, the folding of the first tubing brings the abutting part of the fixing member to move, so that the abutted part of the locking member losses the abutment from the abutting part, and accordingly, the second tubing is moved downwards under the action of gravity or manual operation, so as to realize the movement of the second tubing from the unfolded position to the folded position, thus effectively avoiding interference on other tubings during folding movement due to the unfolding of the second tubing, and thereby avoiding the phenomenon of jamming. The basket avoidance mechanism of the present disclosure has a simple structure.

Preferably, the abutting part is a protruding structure formed by the fixing member extending towards the locking member.

Specifically, abutting part has a cylindrical structure.

Preferably, the abutted part is a protruding structure formed by the locking member extending towards the fixing member.

Specifically, an engaging recess cooperating with the abutting part is arranged on the abutted part.

Specifically, the abutted part has an arc-shaped column structure.

Preferably, the locking member is movably arranged on the second tubing, the locking member has an extended position and a retracted position relative to the second tubing, and the locking member may be switched between the extended position and the retracted position, and the abutted part on the locking member may avoid the abutting part on the fixing member by switching of the locking member between the extended position and the retracted position.

Specifically, the locking member is slidably arranged on the second tubing, and the locking member is slidably switched between the extended position and the retracted position.

Specifically, the basket avoidance mechanism further includes an elastic member, the elastic member provides an elastic force to keep the locking member in the extended position, and the locking member may overcome the elastic force of the elastic member to switch from the extended position to the retracted position by the operation of the locking member.

Specifically, the locking member includes a sliding sleeve and an accommodating cylinder, the abutted part is arranged on the sliding sleeve, the sliding sleeve and the accommodating cylinder are connected to each other, the sliding sleeve is sleeved on the second tubing and slides relative to the second tubing, the elastic member is sleeved on the second tubing, the accommodating cylinder is sleeved on the second tubing and has a cavity for accommodating the elastic member, one end of the elastic member is fixed to the second tubing, and the other end of the elastic member is connected to the accommodating cylinder.

Specifically, the accommodating cylinder is provided with a through hole for providing a movement stroke of the locking member, the through hole directly faces the elastic member.

Specifically, the through hole is an elongated hole.

Specifically, the abutted part has a guide slope, and during a process of switching the second tubing from the folded position to the unfolded position, the abutted part may cooperate with the abutting part under the guidance of the guide slope, so that the locking member is switched from the extended position to the retracted position and avoids the blocking of the abutting part.

Specifically, the guide slope is a circular arc surface.

In order to achieve the above objective, the present disclosure provides a baby stroller frame including a frame body, wherein the frame body includes a third tubing and the above-mentioned basket avoidance mechanism, the first tubing is pivotally connected to the third tubing, the first tubing is pivoted and folded relative to the third tubing to fold the frame, the first tubing is pivoted and unfolded relative to the third tubing to unfold the frame, the second tubing is pivotally connected to the third tubing, so that the second tubing may be switched between the unfolded position and the folded position.

DETAILED DESCRIPTION

Figure 1:
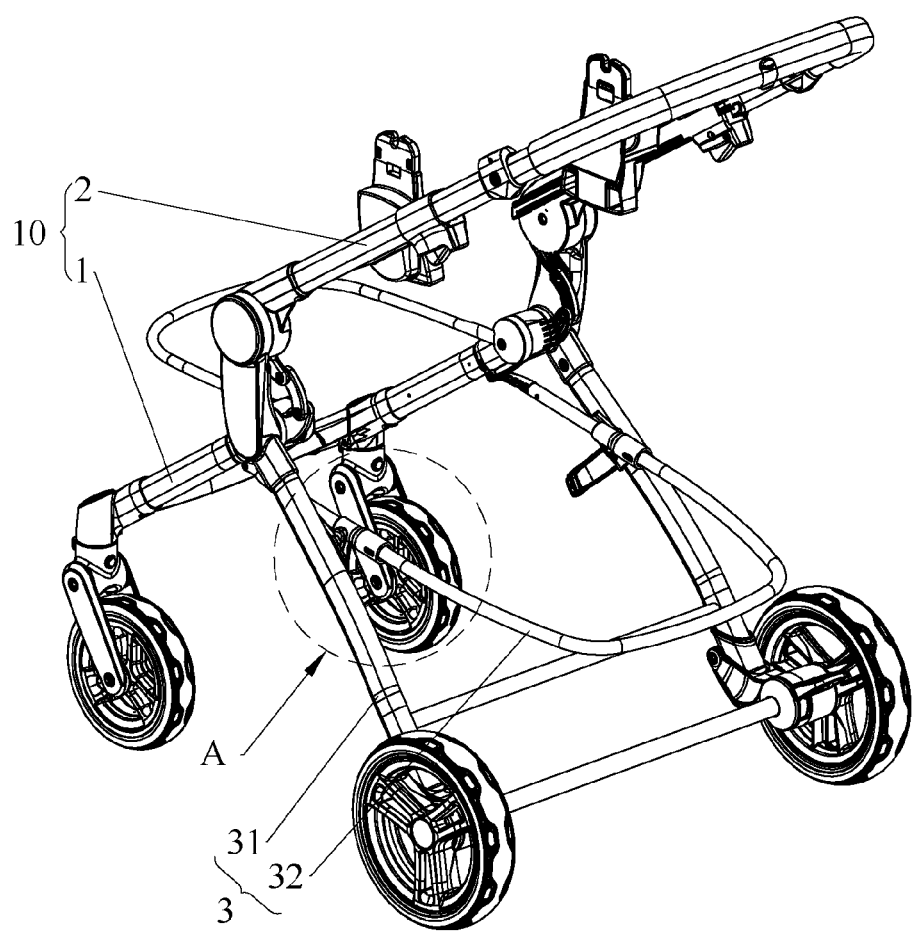
FIG. 1 is a schematic perspective structural view of a baby stroller frame with a frame in an unfolded state and a second tubing in an unfolded position according to the present disclosure.

In order to describe the technical contents and structural features of the present disclosure in detail, the following illustration is provided in conjunction with the embodiments and the accompanying drawings.

FIGS. 1-4 show a specific structure of a baby stroller frame 100 of the present disclosure. The baby stroller frame 100 includes a frame body 10. The frame body 10 includes a third tubing 1, a fourth tubing 2 and a basket avoidance mechanism 3. The basket avoidance mechanism 3 includes a first tubing 31, a second tubing 32, a fixing member 33 and a locking member 34. The first tubing 31 and the third tubing 1 are pivotally connected to a pivotal part. The fourth tubing 2 is pivotally connected to the pivotal part. The first tubing 31 may be pivoted and folded relative to the third tubing 1, and the fourth tubing 2 may be pivoted and folded relative to the first tubing 31, so as to fold the frame. The first tubing 31 may be pivoted and unfolded relative to the third tubing 1, and the fourth tubing 2 may be pivoted and unfolded relative to the first tubing 31, so as to unfolded the frame. The second tubing 32 is pivotally connected to the third tubing 1, so that the second tubing 32 may be switched between an unfolded position and a folded position. When the frame is in the unfolded state, the second tubing 32 may be pivoted relative to the third tubing 1, so that the second tubing 32 is in the unfolded position. When the frame is in the folded state, the second tubing 32 may be pivoted relative to the third tubing 1, so that the second tubing 32 is in the folded position. Meanwhile, the fixing member 33 is arranged on the first tubing 31, and the locking member 34 is arranged on the second tubing 32. The fixing member 33 extends towards the locking member 34 to form an abutting part 331, and the locking member 34 extends according to the abutting part 331 to form an abutted part 341. When the first tubing 31 is unfolded relative to the third tubing 1, by the abutment of the abutting part 331 against the abutted part 341, the second tubing 32 is in the unfolded position under the support of the first tubing 31. When the first tubing 31 is folded relative to the third tubing 1, since the abutment of the abutting part 331 against the abutted part 341 is avoided, the second tubing 32 may be pivoted relative to the third tubing 1 and folded to the folded position. In other words, when the first tubing 31 is folded relative to the third tubing 1, the folding of the first tubing 31 may bring the abutting part 331 of the fixing member 33 to move, so that the abutted part 341 of the locking member 34 may lose the abutment of the abutting part 331, and then the second tubing 32 may move downwards under the action of gravity or manual operation, so as to realize that the second tubing 32 is pivoted relative to the third tubing 1 and moved from the unfolded position to the folded position, thus effectively avoiding interference between the unfolded second tubing 32 and the fourth tubing 2 in the pivoting and folding movement relative to the first tubing 31, and avoiding the phenomenon of jamming between the tubings, thereby ensuring smooth unfolding or folding of the frame. In this embodiment, the first tubing 31 is a rear leg tube, the second tubing 32 is a basket tube, the third tubing 1 is a front leg tub, the fourth tubing 2 is backrest tube, and more specifically as follows.

Figure 4:
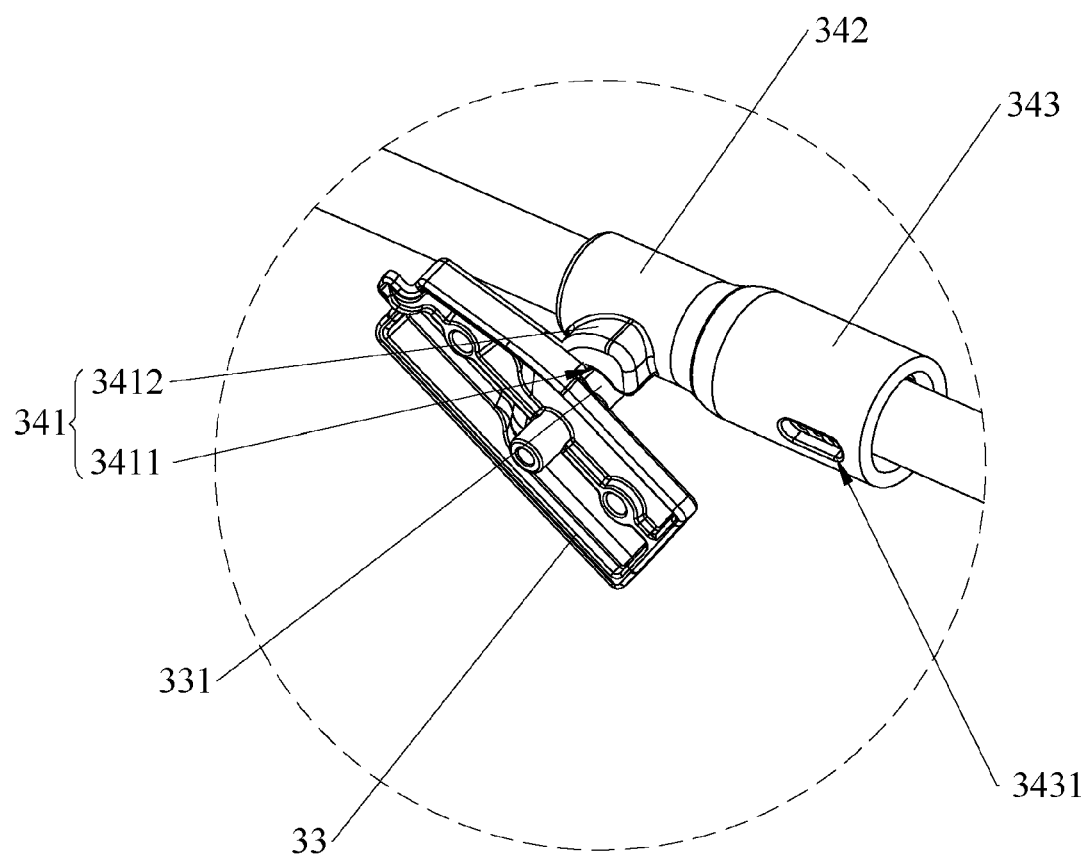
FIG. 4 is a partial enlarged view at a position B shown in FIG. 3.
Figure 5:
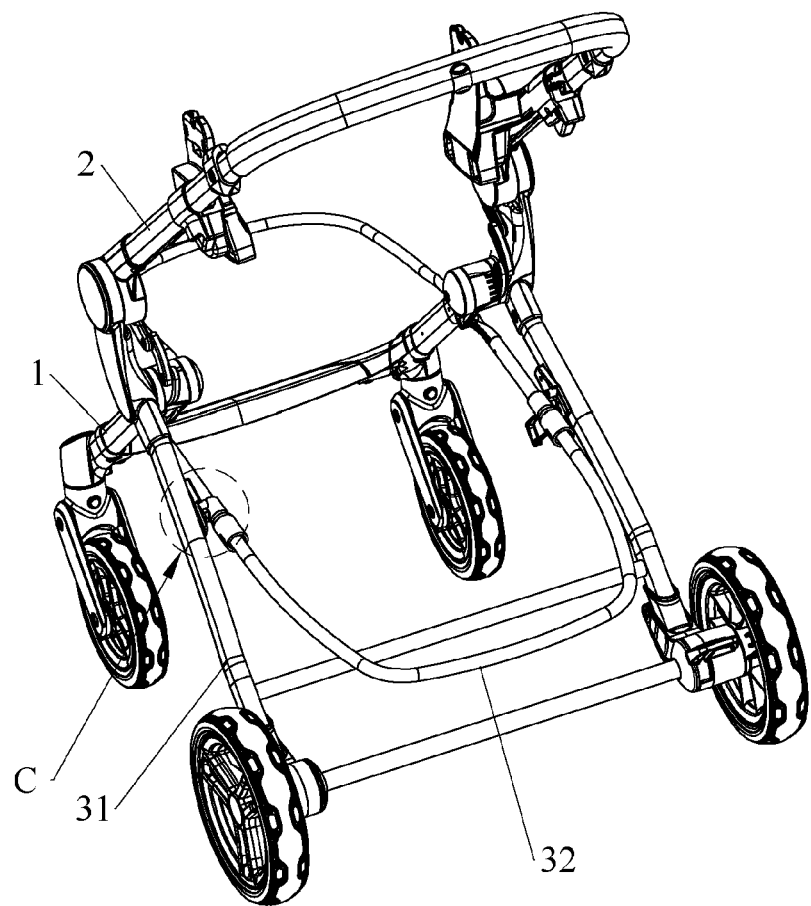
FIG. 5 is a schematic perspective structural view of the baby stroller frame with a frame in an unfolded state and a second tubing switching from a folded position to an unfolded position according to the present disclosure.

Referring to FIG. 4, the abutting part 331 is a protruding structure formed by the fixing member 33 extending towards the locking member 34. Preferably, the abutting part 331 has a cylindrical structure, so as to improve the stability of cooperation between the abutting part 331 and the abutted part 341. The abutted part 341 is a protruding structure formed by the locking member 34 extending towards the fixing member 33, and an engaging recess 3411 cooperating with (for example, clamping with) the abutting part 331 is arranged on the abutted part 341. By utilizing the engagement between the structure of the engaging recess 3411 in the abutted part 341 and the protruding structure of the abutting part 331, the cooperation between the abutted part 341 and the abutting part 331 may be more stable. Preferably, the abutted part 341 has an arc-shaped column structure, so as to improve the stability of cooperation between the abutting part 331 and the abutted part 341.

Figure 6:
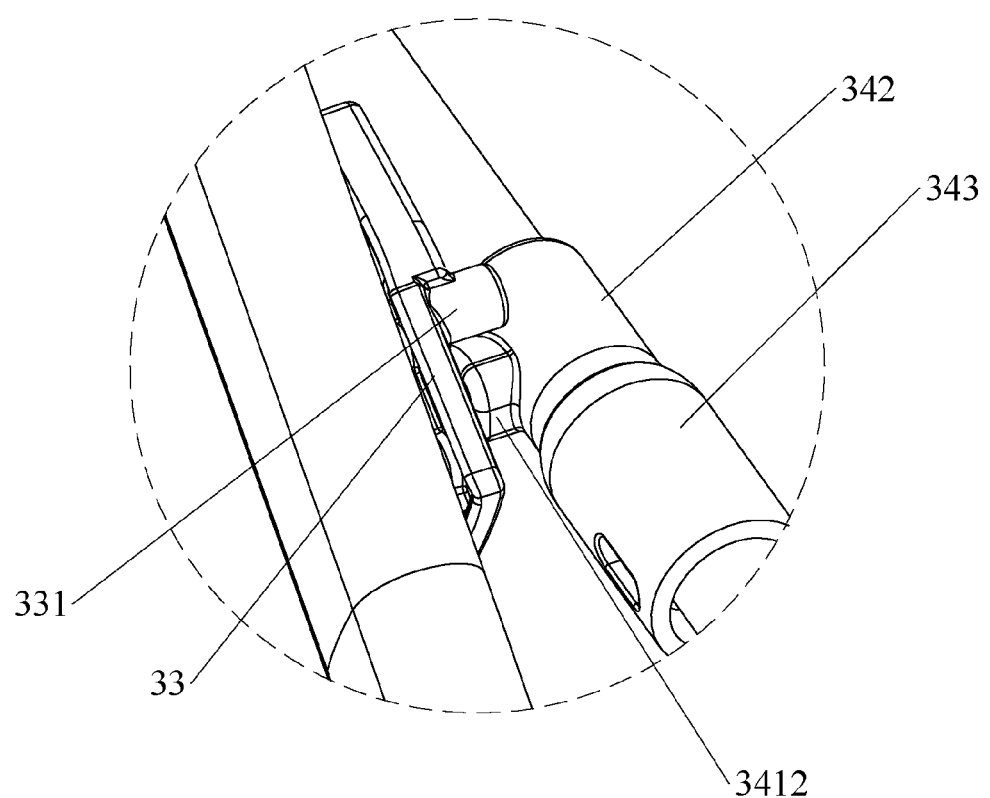
FIG. 6 is a partial enlarged view at a position C shown in FIG. 5.
Figure 7:
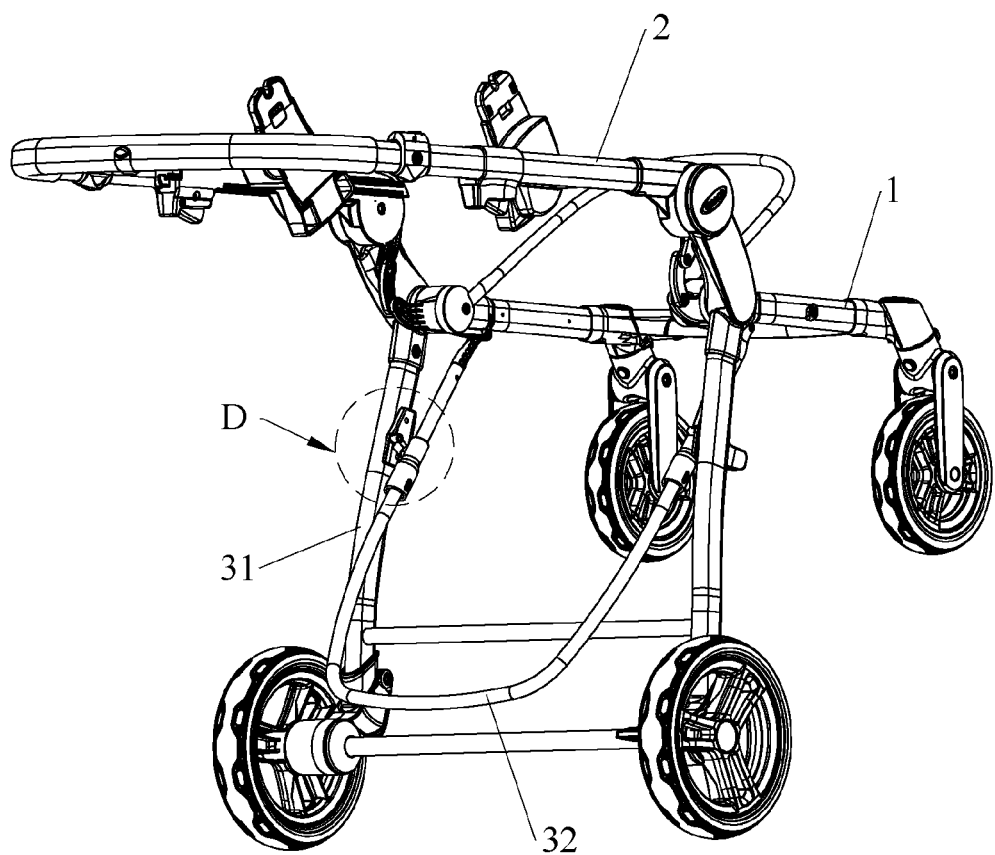
FIG. 7 is another schematic perspective structural view of the baby stroller frame with a frame in an unfolded state and a second tubing switching from a folded position to an unfolded position according to the present disclosure.
Figure 8:
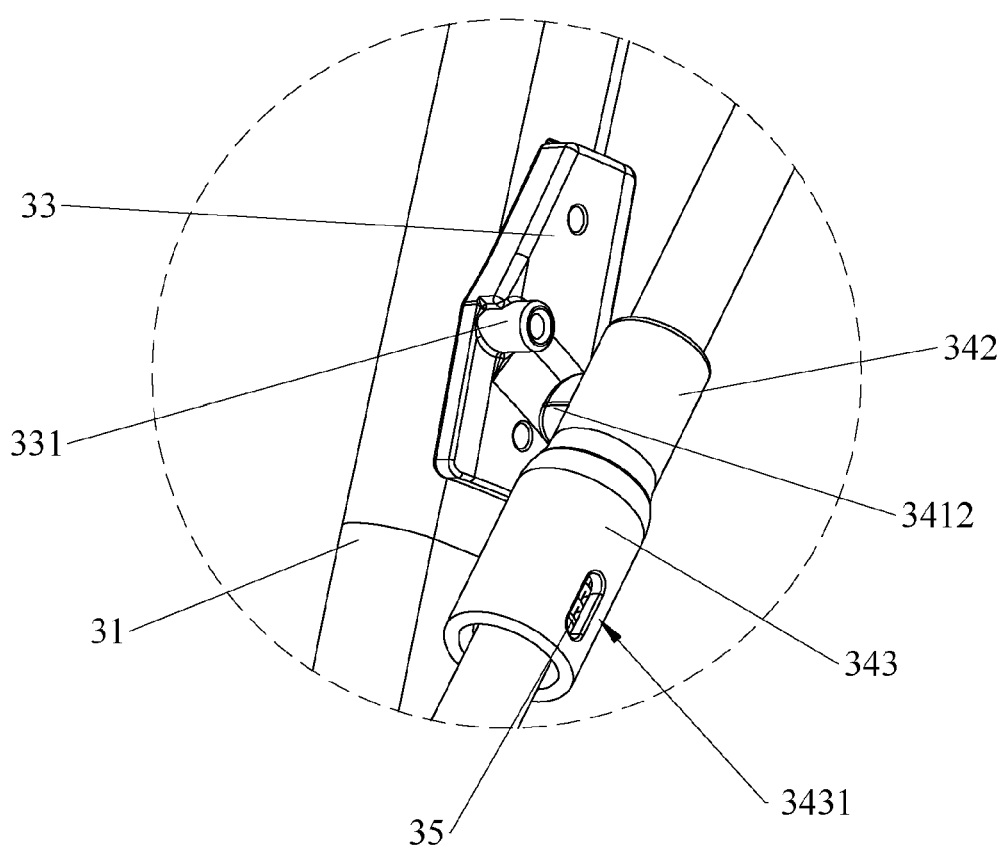
FIG. 8 is a partial enlarged view at a position D shown in FIG. 7.
Figure 9:
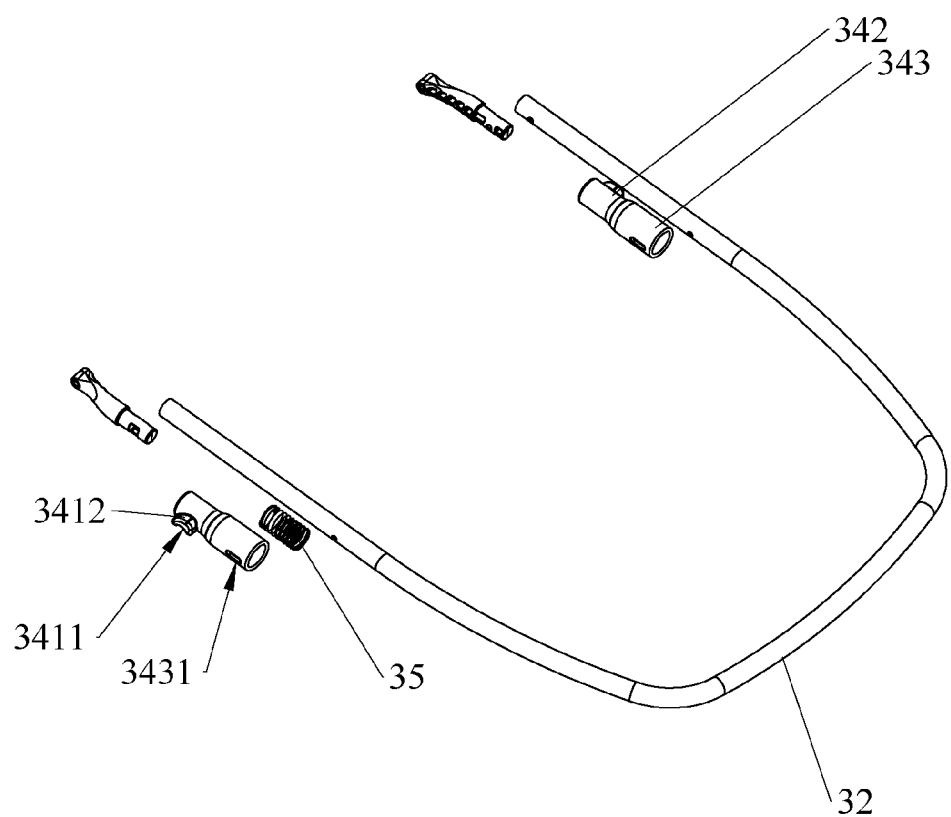
FIG. 9 is a schematic perspective structural view of a second tubing and a locking member of the baby stroller frame in an exploded state according to the present disclosure.
Figure 10:
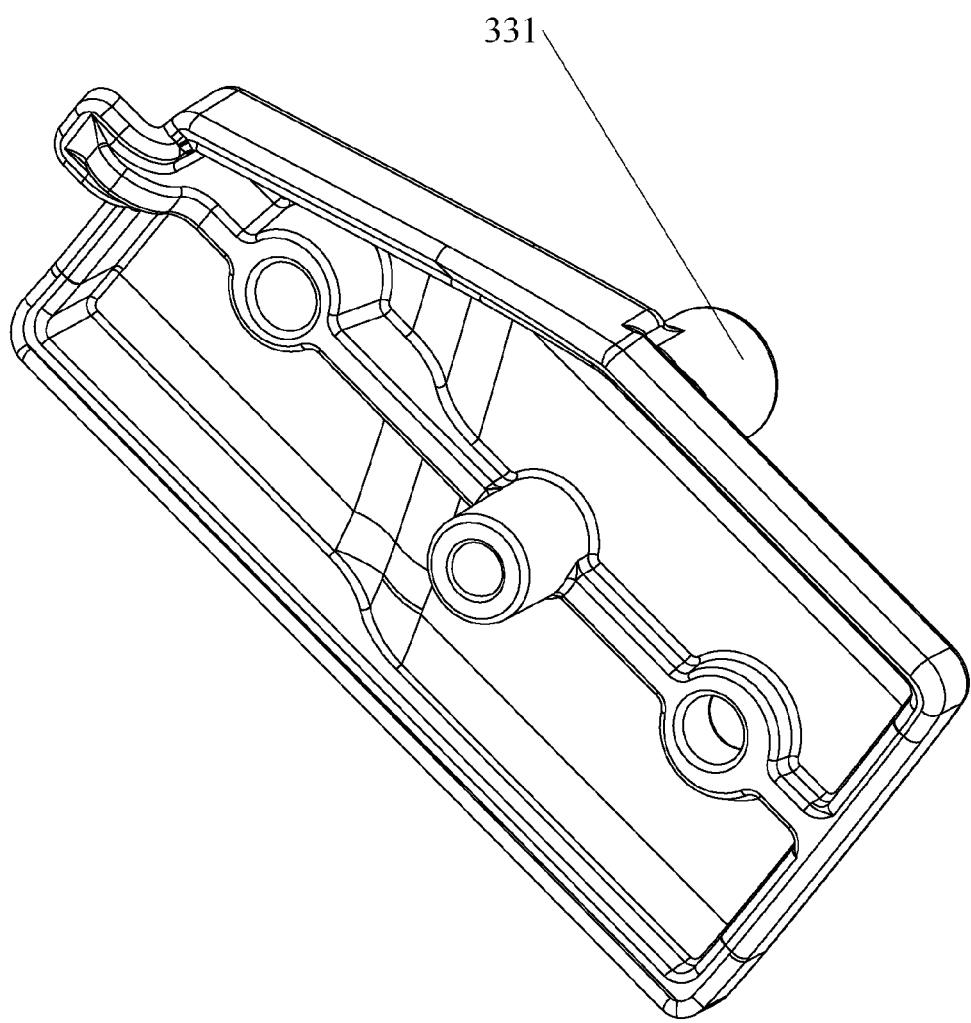
FIG. 10 is a schematic perspective structural view of a fixing member in the baby stroller frame according to the present disclosure.

Referring to FIGS. 3 to 6, the locking member 34 is movably arranged on the second tubing 32, and the locking member 34 has an extended position and a retracted position relative to the second tubing 32 (the extended position is shown in FIG. 4, the retracted position is shown in FIG. 6). The locking member 34 may be switched between the extended position and the retracted position. By switching of the locking member 34 between the extended position and the retracted position, the abutted part 341 on the locking member 34 may avoid the abutting part 331 on the fixing member 33. In other words, when the frame is in the unfolded state, during the process of rotating the second tubing 32 from the folded position to the unfolded position, the locking member 34 is configured to move from the extended position to the retracted position, so that the abutted part 341 on the locking member 34 may avoid the abutment of the abutting part 331 on the fixing member 33, and the second tubing 32 may rotate smoothly from the folded position to the unfolded position. When the second tubing 32 rotates to the unfolded position, the locking member 34 is configured to move from the retracted position to the extended position, so that the abutted part 341 on the locking member 34 may abut against the abutting part 331 on the fixing member 33, and the second tubing 32 is maintained in the extended position. Specifically, the locking member 34 is slidably arranged on the second tubing 32, and the locking member 34 is slidably switched between the extended position and the retracted position, thereby improving the smoothness of the movement.

Referring to FIGS. 3-4 and 8-9, the basket avoidance mechanism 3 may further include an elastic member 35. The elastic member 35 provides an elastic force to keep the locking member 34 in the extended position, so that the locking member 34 is maintained in the extended position. By operating the locking member 34, the locking member 34 may overcome the elastic force of the elastic member 35 and switch from the extended position to the retracted position, so that the locking member 34 may move to the retracted position, thereby realizing the switching of the locking member 34 between the extended position and the retracted position. Specifically, the locking member 34 includes a sliding sleeve 342 and an accommodating cylinder 34. The abutted part 341 is arranged on the sliding sleeve 342, and the abutted part 341 is formed by an outer wall of the sliding sleeve 342 extending outwards. The sliding sleeve 342 and the accommodating cylinder 343 are connected to each other. The sliding sleeve 342 is sleeved on the second tubing 32 and may slide relative to the second tubing 32 in a direction of an axis of the second tubing 32. The elastic member 35 is sleeved on the second tubing 32. The accommodating cylinder 343 is sleeved on the second tubing 32 and has a cavity for accommodating the elastic member 35. One end of the elastic member 35 is fixed to the second tubing 32, and the other end of the elastic member 35 is connected to the accommodating cylinder 343. By manual operation of the sliding sleeve 342, the accommodating cylinder 343 may overcome the elastic force of the elastic member 35 to slide. Preferably, the elastic member 35 is a compression spring, but it is not limited thereto. Meanwhile, the accommodating cylinder 343 is provided with a through hole 3431 for providing the movement stroke of the locking member 34, and the through hole 3431 directly faces the elastic member 35. The user may observe the movement stroke of the locking member 34 by the through hole, so as to improve convenience in use. Preferably, the through hole 3431 is an elongated hole, which corresponds to a contour of the elastic member 35, thereby making the components more compact.

Figure 2:
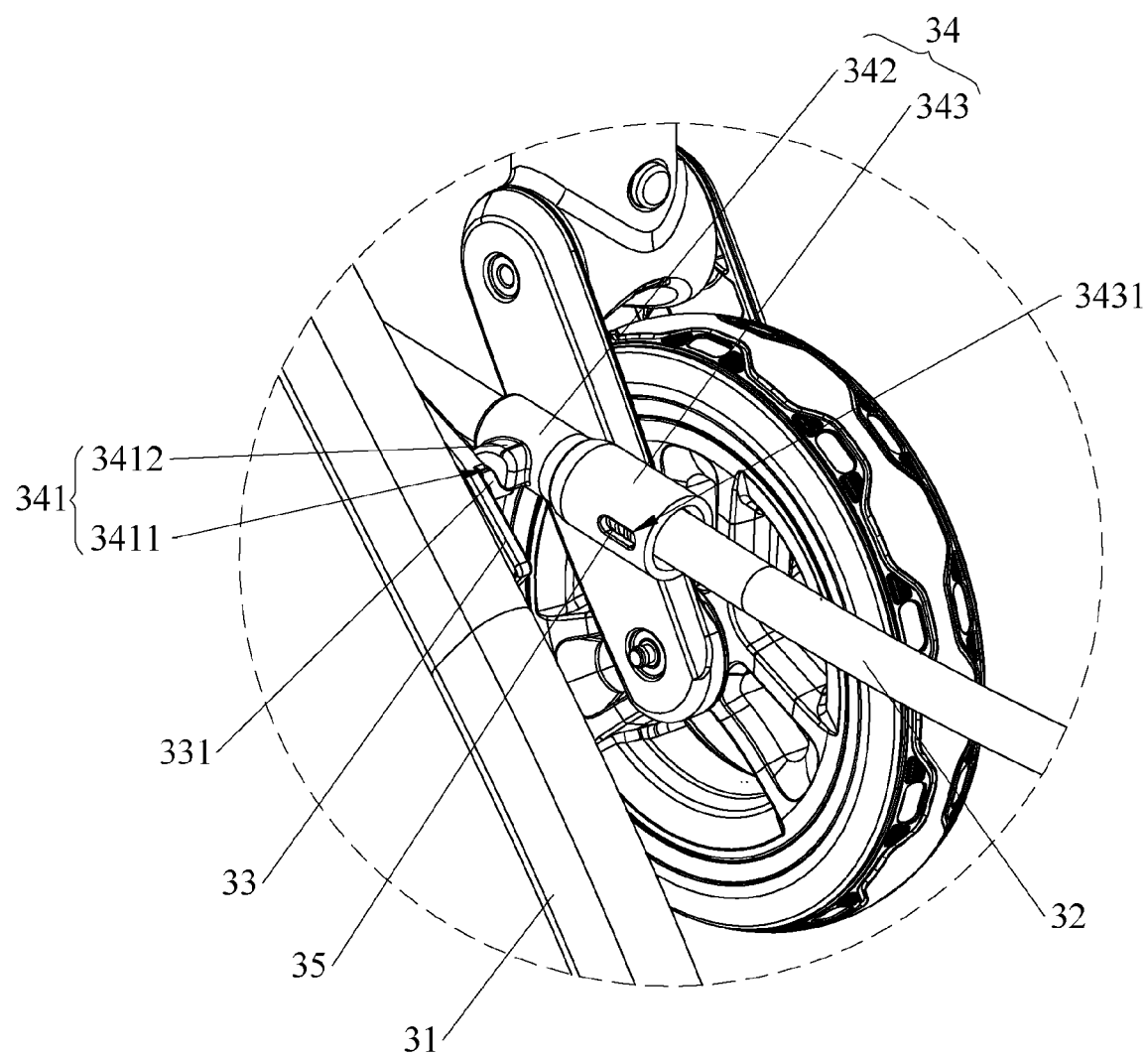
FIG. 2 is a partial enlarged view at a position A shown in FIG. 1.
Figure 3:
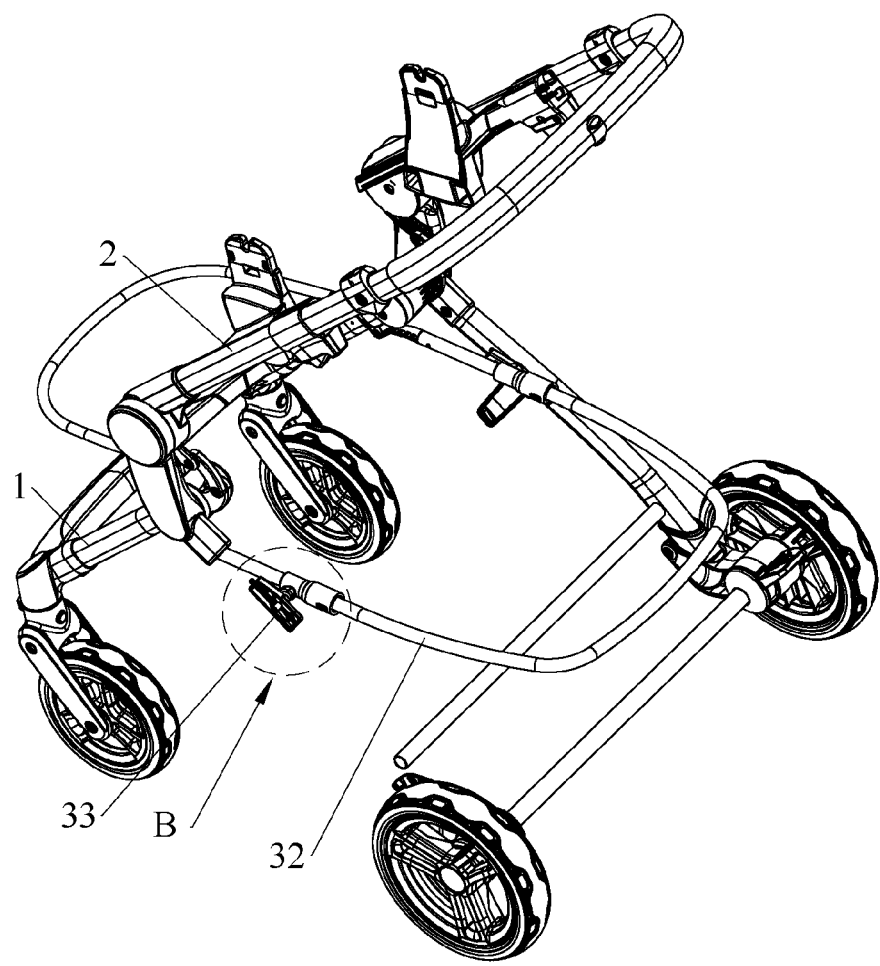
FIG. 3 is a schematic perspective structural view of the baby stroller frame in FIG. 1 after a first tubing is hidden.

Referring to FIGS. 1-2, the abutted part 341 has a guide slope 3412. The guide slope 3412 is located at a side of the abutted part 341 facing away from the engaging recess 3411. When the first tubing 31 is unfolded relative to the third tubing 1, during the process of switching the second tubing 32 from the folded position to the unfolded position, the abutted part 341 may cooperate with the abutting part 331 under the guidance of the guide slope 3412, so that the locking member 34 may switch from the extended position to the retracted position and avoid blocking of the abutting part 331 (see the state in FIG. 6), and finally, the locking member 34 may switch from the retracted position to the extended position after being separated from the guide slope 3412. Preferably, the guide slope 3412 is a circular arc surface, but it is not limited thereto.

In summary, referring to FIGS. 1-10, a process for using the baby stroller frame 100 of the present disclosure will be specifically provided as follows.

When the frame needs to be folded, the first tubing 31 may be pivoted and folded relative to the third tubing 1, and the abutting part 331 of the fixing member 33 avoids abutting against the abutted part 341 of the locking member 34, that is, the abutting part 331 of the fixing member 33 is staggered with the abutted part 341 of the locking member 34, so that the second tubing 32 may be pivoted relative to the third tubing 1 and folded to the folded position, and the fourth tubing 2 is pivoted and folded relative to the first tubing 31, thus effectively avoiding interference between the pivoting and folding of the second tubing 32 and the third tubing 1 and the pivoting and folding of the fourth tubing 2 and the first tubing 31.

When the frame needs to be unfolded, the first tubing 31 may be pivoted and unfolded relative to the third tubing 1, the fourth tubing 2 is pivoted and unfolded relative to the first tubing 31, and the second tubing 32 is pivoted and unfolded relative to the third tubing 1. During the process that the second tubing 32 is switching from the folded position to the unfolded position, the abutted part 341 may cooperate with the abutting part 331 under guiding of the guide slope 3412, such that the locking member 34 is switched from the extended position to the retracted position and avoids blocking of the abutting part 331, and finally, the locking member 34 may switch from the retracted position to the extended position after being separated from the guide slope 3412. The abutment of the abutting part 331 against the abutted part 341 keeps the second tubing 32 in the unfolded position under the support of the first tubing 31.

Since in the basket avoidance mechanism 3 of the present disclosure, the fixing member 33 is arranged on the first tubing 31, and the locking member 34 is arranged on the second tubing 32, the fixing member 33 extends towards the locking member 34 to form the abutting part 331, and the locking member 34 extends corresponding to the abutting part 331 to form the abutted part 341, accordingly, when the first tubing 31 is unfolded, with the abutment of the abutting part 331 against the abutted part 341, the second tubing 32 may be in the unfolded position under the support of the first tubing 31, so that the use state of the first tubing 31 may be used to keep the second tubing 32 in the unfolded position. When the first tubing 31 is folded, by avoiding the abutment of the abutting part 331 against the abutted part 341, the second tubing 32 may be folded from the unfolded position to the folded position. In other words, when the first tubing 31 is folded, the folding of the first tubing 31 brings the abutting part 331 of the fixing member 33 to move, so that the abutted part 341 of the locking member 34 losses the abutment of the abutting part 331, and then the second tubing 32 moves downwards under the action of gravity or manual operation, so as to realize the movement of the second tubing 32 from the unfolded position to the folded position, thus effectively avoiding interference on other tubings in folding movement due to the unfolding of the second tubing 32, and thereby avoiding the phenomenon of jamming. The basket avoidance mechanism 3 of the present disclosure also has the advantage of simple structure.

The above disclosure is only the preferred embodiments of the present disclosure. Of course, the scope of the present disclosure cannot be limited by the above disclosure. Therefore, the equivalent changes made according to the scope of the present disclosure still fall within the scope of the present disclosure.

What is claimed is:

1. A basket avoidance mechanism, comprising:
a first tubing and a second tubing,
a fixing member arranged on the first tubing,
a locking member arranged on the second tubing,
the fixing member comprises an abutting part that extends towards the locking member, and
the locking member comprises an abutted part, the abutted part extends towards the abutting part in a direction that is orthogonal to a length of the second tubing,
wherein when the first tubing is unfolded, the second tubing is in an unfolded position and supported by the first tubing by abutment of the abutting part against the abutted part, and
when the first tubing is folded, the second tubing avoids abutment of the abutting part against the abutted part and is folded to a folded position.

2. The basket avoidance mechanism according to claim 1, wherein the abutting part is a protruding structure formed by the fixing member extending towards the locking member.

3. The basket avoidance mechanism according to claim 2, wherein the abutting part has a cylindrical structure.

4. The basket avoidance mechanism according to claim 1, wherein the abutted part is a protruding structure.

5. The basket avoidance mechanism according to claim 4, wherein an engaging recess cooperating with the abutting part is arranged on the abutted part.

6. The basket avoidance mechanism according to claim 5, wherein the abutted part has an arc-shaped column structure.

7. The basket avoidance mechanism according to claim 1, wherein the locking member is movably arranged on the second tubing, the locking member has an extended position and a retracted position relative to the second tubing, the locking member is switchable between the extended position and the retracted position, and the abutted part on the locking member is capable of avoiding the abutting part on the fixing member by switching of the locking member between the extended position and the retracted position.

8. The basket avoidance mechanism according to claim 7, wherein the locking member is slidably arranged on the second tubing, and the locking member is slidably switched between the extended position and the retracted position.

9. The basket avoidance mechanism according to claim 7, wherein the basket avoidance mechanism further comprises an elastic member for providing an elastic force to keep the locking member in the extended position, the locking member is configured to be operated to overcome the elastic force of the elastic member and switch from the extended position to the retracted position.

10. The basket avoidance mechanism according to claim 9, wherein the locking member includes a sliding sleeve and an accommodating cylinder, the abutted part is arranged on the sliding sleeve, the sliding sleeve and the accommodating cylinder are connected to each other, the sliding sleeve is sleeved on the second tubing and slides relative to the second tubing, the elastic member is sleeved on the second tubing, the accommodating cylinder is sleeved on the second tubing and has a cavity for accommodating the elastic member, one end of the elastic member is fixed to the second tubing, and the other end of the elastic member is connected to the accommodating cylinder.

11. The basket avoidance mechanism according to claim 10, wherein the accommodating cylinder is provided with a through hole for providing a movement stroke of the locking member, and the through hole directly faces the elastic member.

12. The basket avoidance mechanism according to claim 11, wherein the through hole is an elongated hole.

13. The basket avoidance mechanism according to claim 7, wherein the abutted part has a guide slope, and during a process of switching the second tubing from the folded position to the unfolded position, the abutted part is capable of cooperating with the abutting part under a guidance of the guide slope, so that the locking member is switched from the extended position to the retracted position and avoids blocking of the abutting part.

14. The basket avoidance mechanism according to claim 13, wherein the guide slope is a circular arc surface.

15. A baby stroller frame comprising:
a frame body comprising a third tubing and a basket avoidance mechanism, and
the basket avoidance mechanism comprising a first tubing, a second tubing, a fixing member and a locking member, the fixing member is arranged on the first tubing, the locking member is arranged on the second tubing, the fixing member comprises an abutting part that extends towards the locking member, and the locking member comprises an abutted part, the abutted part is a protruding structure that extends towards the abutting part,
wherein when the first tubing is unfolded, the second tubing is in an unfolded position and supported by the first tubing by abutment of the abutting part against the abutted part, and when the first tubing is folded, the second tubing avoids abutment of the abutting part against the abutted part and is folded to a folded position, and
wherein the first tubing is pivotally connected to the third tubing, the first tubing is pivoted and folded relative to the third tubing to fold the baby stroller frame, the first tubing is pivoted and unfolded relative to the third tubing to unfold the baby stroller frame, the second tubing is pivotally connected to the third tubing, so that the second tubing is switchable between the unfolded position and the folded position.

16. The basket avoidance mechanism according to claim 1, wherein the first tubing comprises a rear leg tube and the second tubing comprises a basket tube.

17. The basket avoidance mechanism according to claim 1, wherein the abutting part extends towards the abutted part in a direction that is orthogonal to a length of the first tubing.

18. The basket avoidance mechanism according to claim 15, wherein the abutting part extends towards the abutted part in a direction that is orthogonal to a length of the first tubing, and the abutted part extends towards the abutting part in a direction that is orthogonal to a length of the second tubing.

19. A basket avoidance mechanism, comprising:
- a first tubing and a second tubing,
- a fixing member arranged on the first tubing,
- a locking member arranged on the second tubing,
- the fixing member comprises an abutting part that extends towards the locking member, and
- the locking member comprises an abutted part that extends towards the abutting part, a sliding sleeve and an accommodating cylinder, the abutted part is arranged on the sliding sleeve, the sliding sleeve and the accommodating cylinder are connected to each other, the sliding sleeve is sleeved on the second tubing and slides relative to the second tubing, an elastic member is sleeved on the second tubing, the accommodating cylinder is sleeved on the second tubing and has a cavity for accommodating the elastic member, one end of the elastic member is fixed to the second tubing, and the other end of the elastic member is connected to the accommodating cylinder,
- wherein when the first tubing is unfolded, the second tubing is in an unfolded position and supported by the first tubing by abutment of the abutting part against the abutted part, and
- when the first tubing is folded, the second tubing avoids abutment of the abutting part against the abutted part and is folded to a folded position.

\* \* \* \* \*